United States Patent
Déjean

(10) Patent No.: US 9,965,809 B2
(45) Date of Patent: May 8, 2018

(54) METHOD AND SYSTEM FOR EXTRACTING MATHEMATICAL STRUCTURES IN TABLES

(71) Applicant: Xerox Corporation, Norwalk, CT (US)

(72) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/218,275

(22) Filed: Jul. 25, 2016

(65) Prior Publication Data
US 2018/0025436 A1 Jan. 25, 2018

(51) Int. Cl.
| | |
|---|---|
| *G06K 9/00* | (2006.01) |
| *G06Q 40/00* | (2012.01) |
| *G06F 5/01* | (2006.01) |
| *G06K 9/46* | (2006.01) |
| *G06K 9/18* | (2006.01) |

(52) U.S. Cl.
CPC ............... *G06Q 40/12* (2013.12); *G06F 5/01* (2013.01); *G06K 9/00449* (2013.01); *G06K 9/18* (2013.01); *G06K 9/4604* (2013.01)

(58) Field of Classification Search
CPC .. G06Q 40/12; G06K 9/00442; G06K 9/4604; G06K 9/18; G06K 9/00449; G06F 5/01
See application file for complete search history.

(56) References Cited

U.S. PATENT DOCUMENTS

| | | | |
|---|---|---|---|
| 5,893,131 A * | 4/1999 | Kornfeld | G06F 17/30424 707/E17.005 |
| 6,006,240 A * | 12/1999 | Handley | G06K 9/00449 715/212 |
| 6,336,094 B1 | 1/2002 | Ferguson et al. | |
| 7,653,871 B2 | 1/2010 | LaComb et al. | |
| 7,668,372 B2 | 2/2010 | Schiehlen | |
| 7,752,538 B2 | 7/2010 | Vion-Dury | |
| 7,856,388 B1 | 12/2010 | Srivastava et al. | |
| 8,270,721 B2 | 9/2012 | Schiehlen | |
| 9,008,443 B2 | 4/2015 | Déjean | |
| 9,189,461 B2 | 11/2015 | Déjean | |
| 2002/0178183 A1 | 11/2002 | Meding | |
| 2004/0194009 A1 | 11/2004 | LaComb et al. | |
| 2009/0006156 A1* | 1/2009 | Hunt | G06Q 10/063 705/7.11 |
| 2013/0321867 A1 | 12/2013 | Déjean | |
| 2014/0365872 A1 | 12/2014 | Déjean | |
| 2015/0169510 A1 | 6/2015 | Déjean | |
| 2016/0063322 A1 | 3/2016 | Déjean et al. | |

OTHER PUBLICATIONS

U.S. Appl. No. 14/955,410, filed Dec. 1, 2015, Hervé Déjean.
(Continued)

*Primary Examiner* — Stephen R Koziol
*Assistant Examiner* — Shaghayegh Azima
(74) *Attorney, Agent, or Firm* — Fay Sharpe LLP

(57) ABSTRACT

Disclosed is a method and system for extracting a mathematical structure associated with a financial table. According to an exemplary embodiment, the method uses a LR-(Left-to-Right) parser reducing stack and a LR-parser nonreducing stack to generate a final reducing stack representative of the mathematical structure.

14 Claims, 19 Drawing Sheets

(56) References Cited

OTHER PUBLICATIONS

Bartoli et al., article entitled "Semisupervised Wrapper Choice and Generation for Print-Oriented Documents", Department of Engineering and Architecture (DIA), University of Trieste, Via Valerio 10, 34127 Trieste, Italy, IEEE Transactions on Knowledge and Data Engineering, vol. 26, No. 1, Jan. 2014, pp. 208-220.

Belaïd et al., article entitled "Morphological Tagging Approach in Document Analysis of Invoices", 17th International Conference on Pattern Recognition (ICPR'2004). (Cambridge, UK). IEEE, 2004. pp. 469-472.

Coüasnon et al., "Recognition of Tables and Forms", Handbook of Document Image Processing and Recognition, Doermann and Tombre (Eds), Springer-Verlag, London, pp. 647-667, 2014.

Coüasnon, "DMOS, A Generic Document Recognition Method: Application to Table Structure Analysis in a General and in a Specific Way", Int J Doc Anal Recognit 8, pp. 111-122.

Embley et al., "Table-Processing Paradigms: A Research Survey", Int J Doc Anal Recognit 8, pp. 66-86, Jan. 2005.

Fang et al., "A Table Detection Method for Multipage PDF Documents Via Visual Separators and Tabular Structures", International Conference on Document Analysis and Recognition, ICDAR 2011.

Janssen et al., article entitled "Receipts2go: The Big World of Small Documents", In Proceedings of the 2012 ACM symposium on Document Engineering (DocEng '12), Sep. 4-7, 2012, 4 pages.

Knuth, D. E., "On the Translation of Languages From Left to Right", Information and Control 8, 607-639, Jul. 1965.

Nagy et al., "A Prototype Document Image Analysis System for Technical Journals", CSE Journal Article, Department of Computer Science and Engineering, pp. 10-22, Jul. 1992.

Ramel et al., "Detection, Extraction and Representation of Tables", Seventh International Conference on Document Analysis and Recognition, 2003.

Silva et al., "Design of an End-To-End Method to Extract Information From Tables", pp. 1-47.

"Special Issue on Detection and Understanding of Tables and Forms for Document Processing Applications", International Journal of Document Analysis, Springer-Verlag 2006, published online Apr. 7, 2006.

U.S. Securities and Exchange Commission, http://www.sec.gov/Archives/edgar/data/729528/000005193112000789/ afis_nq.htm.

Wong et al., The Smearing algorithm, "Document analysis system", IBM Journal of Research and Development, vol. 26, No. 6, pp. 647-656, Nov. 1982.

Zanibbi et al., "A Survey of Table Recognition: Models, Observations, Transformations, and Inferences," Oct. 24, 2003.

\* cited by examiner

| |
|---|
| 7,000,000 |
| 10,000,000 |
| 15,000,000 |
| 8,000,000 |
| 5,000,000 |
| 8,000,000 |
| 13,000,000 |
| 5,000,000 |
| 8,000,000 |
| 79,000,000 |

FIG. 5

| TOTAL STACK | CURRENT VALUE | OPERATIONS |
|---|---|---|
|  | 7,000,000 | SHIFT |
| 7,000,000 | 10,000,000 | SHIFT |
| 10,000,000<br>7,000,000 | 15,000,000 | SHIFT |
| 15,000,000<br>10,000,000<br>7,000,000 | 8,000,000 | SHIFT |
| 8,000,000<br>15,000,000<br>10,000,000<br>7,000,000 | 5,000,000 | SHIFT |
| 5,000,000<br>8,000,000<br>15,000,000<br>10,000,000<br>7,000,000 | 8,000,000 | SHIFT |
| 13,000,000<br>15,000,000<br>10,000,000<br>7,000,000 | 13,000,000<br>=8,000,000 +5,000,000 | REDUCE |

FIG. 6

| TOTAL STACK | CURRENT VALUE | OPERATIONS |
|---|---|---|
| 13,000,000 <br> 15,000,000 <br> 10,000,000 <br> 7,000,000 | 5,000,000 | SHIFT |
| 5,000,000 <br> 13,000,000 <br> 15,000,000 <br> 10,000,000 <br> 7,000,000 | 8,000,000 | SHIFT |
| 8,000,000 <br> 5,000,000 <br> 13,000,000 <br> 8,000,000 <br> 15,000,000 <br> 10,000,000 <br> 7,000,000 | 79,000,000 | SHIFT |
| 79,000,000 <br> 8,000,000 <br> 5,000,000 <br> 13,000,000 <br> 8,000,000 <br> 15,000,000 <br> 10,000,000 <br> 7,000,000 | | FINAL STACK |

FIG. 6
CONTINUED

| NORMAL STACK | FLAT STACK | CURRENT VALUE | OPERATIONS | |
|---|---|---|---|---|
| | | | NORMAL STACK | FLAT STACK |
| ☐ | | 7,000,000 | | |
| 7,000,000 | 7,000,000 | 10,000,000 | SHIFT | SHIFT |
| 10,000,000<br>7,000,000 | 10,000,000<br>7,000,000 | 15,000,000 | SHIFT | SHIFT |
| 15,000,000<br>10,000,000<br>7,000,000 | 15,000,000<br>10,000,000<br>7,000,000 | 8,000,000 | SHIFT | SHIFT |
| 8,000,000<br>15,000,000<br>10,000,000<br>7,000,000 | 8,000,000<br>15,000,000<br>10,000,000<br>7,000,000 | 5,000,000 | SHIFT | SHIFT |
| 5,000,000<br>8,000,000<br>15,000,000<br>10,000,000<br>7,000,000 | 5,000,000<br>8,000,000<br>15,000,000<br>10,000,000<br>7,000,000 | 8,000,000 | SHIFT | SHIFT |
| 13,000,000<br>8,000,000<br>15,000,000<br>10,000,000<br>7,000,000 | 8,000,000<br>5,000,000<br>8,000,000<br>15,000,000<br>10,000,000<br>7,000,000 | 13,000,000<br>=8,000,000 + 5,000,000 | REDUCE OPERATION | SHIFT (NO REDUCE PERFORMED) |

FIG. 7

| NORMAL STACK | FLAT STACK | CURRENT VALUE | OPERATIONS NORMAL STACK | FLAT STACK |
|---|---|---|---|---|
| 13,000,000<br>8,000,000<br>15,000,000<br>10,000,000<br>7,000,000 | 13,000,000<br>8,000,000<br>5,000,000<br>8,000,000<br>15,000,000<br>10,000,000<br>7,000,000 | 5,000,000 | SHIFT | SHIFT |
| 5,000,000<br>13,000,000<br>8,000,000<br>15,000,000<br>10,000,000<br>7,000,000 | 8,000,000<br>13,000,000<br>8,000,000<br>5,000,000<br>8,000,000<br>15,000,000<br>10,000,000<br>7,000,000 | 8,000,000 | | |
| 8,000,000<br>5,000,000<br>13,000,000<br>8,000,000<br>15,000,000<br>10,000,000<br>7,000,000 | 8,000,000<br>13,000,000<br>8,000,000<br>5,000,000<br>8,000,000<br>15,000,000<br>10,000,000<br>7,000,000 | 79,000,000 | | REDUCE FOUND WITH FLAT STACK: PERFORMED ON 'NORMAL STACK' |
| 79,000,000 | 79,000,000<br>8,000,000<br>5,000,000<br>13,000,000<br>8,000,000<br>5,000,000<br>8,000,000<br>15,000,000<br>10,000,000<br>7,000,000 | | | |

FIG. 7
CONTINUED

| FUND INVESTMENTS | SHARES | VALUE (000) |
|---|---|---|
| GROWTH-AND-INCOME FUNDS - 20.0% | | |
| AMERICAN MUTUAL FUND, CLASS R-6 | 813,100 | $ 24,044 |
| EQUITY-INCOME AND BALANCED FUNDS - 20.0% | | |
| THE INCOME FUND OF AMERICA, CLASS R-6 | 1,289,188 | 22,044 |
| BOND FUNDS - 60.0% | | |
| AMERICAN FUNDS MORTGAGE FUND, CLASS R-6 | 2,375,826 | 30,054 |
| THE BOND FUND OF AMERICA, CLASS R-6 | 2,337,030 | 30,054 |
| INTERMEDIATE BOND FUND OF AMERICA, CLASS R-6 | 1,317,204 | 18,033 |
| | | 78,141 |
| TOTAL INVESTMENT SECURITIES (COST: $119,354,000) | | 124,229 |
| OTHER ASSETS LESS LIABILITIES | | (47) |
| NET ASSETS | | $124,182 |

FIG. 9

| | | |
|---|---|---|
| | | |
| | 813,100 | $ 24,044 |
| | | |
| | 1,289,188 | 22,044 |
| | | |
| | 2,375,826 | 30,054 |
| | 2,337,030 | 30,054 |
| | 1,317,204 | 18,033 |
| | | 78,141 |
| | | 124,229 |
| | | (47) |
| | | $124,182 |

FIG. 10

| | CELL | MATHEMATICAL STRUCTURE | NORMAL STACK | FLAT STACK |
|---|---|---|---|---|
| 1 | 24044 | | [24044] | [24044] |
| 2 | 22044 | | [24044, 22044] | [24044, 22044] |
| 3 | 30054 | | [24044, 22044, 30054] | [24044, 22044, 30054] |
| 4 | 30054 | [30054 = 30054] (SUM FOUND IN NORMAL STACK) | [24044, 22044, 30054, 30054] | [24044, 22044, 30054, 30054] |
| | REDUCE OPERATION | | [24044, 22044, 30054] | |
| 5 | 18033 | | [24044, 22044, 30054, 18033] | [24044, 22044, 30054, 18033] |
| 6.a | 78141 | [78141 = [30054, 30054, 18033]] (NOTHING FOUND FOR NORMAL STACK; ONE SUM FOUND IN THE FLAT STACK) | [24044, 22044, 30054, 18033, 78141] | [24044, 22044, 30054, 30054, 18033, 78141] |
| 6.b | | UPDATING NORMAL STACK AND MATHEMATICAL STRUCTURE: [30054 = 30054] IS DELETED SINCE COVERED BY THE NEW SUM | NEW NORMAL STACK [24044, 22044, 78141] | UNTOUCHED |

FIG. 11

| | CELL | MATHEMATICAL STRUCTURE | NORMAL STACK | FLAT STACK |
|---|---|---|---|---|
| 7 | 124229 | [124229 = [24044 + 22044 + 78141] | [24044, 22044, 78141], 124229] | [24044, 22044, 30054, 30054, 18033, 78141, 124229] |
| | REDUCE OPERATION | | [124229] | |
| 8 | -47 | | [124229, -47] | [24044, 22044, 30054, 30054, 18033, 78141, 124229, -47] |
| 9 | 124182 | 124182 = 124229 + -47 | [124229, -47, 124182] | [24044, 22044, 30054, 30054, 18033, 78141, 124229, -47, 124182] |
| | REDUCE OPERATION | | [124182] | |
| | FINAL STRUCTURE | [124182=<br>[-47<br>[+124229=<br>78141=<br>[30054+3<br>0054+180<br>33]<br>+22024<br>+24024 | | |

FIG. 11
CONTINUED

| | |
|---|---:|
| NET ASSETS | 124,182 |
| OTHER ASSETS LESS LIABILITIES | -47 |
| TOTAL INVESTMENT SECURITIES (COST: $119,354,000) | 124,229 |
| BOND FUNDS - 60.0% | 78,141 |
| AMERICAN FUNDS MORTGAGE FUND, CLASS R-6 | 30,054 |
| THE BOND FUND OF AMERICA, CLASS R-6 | 30,054 |
| INTERMEDIATE BOND FUND OF AMERICA, CLASS R-6 | 18,033 |
| EQUITY-INCOME AND BALANCED FUNDS - 20.0% | |
| THE INCOME FUND OF AMERICA, CLASS R-6 | 22,044 |
| GROWTH-AND-INCOME FUNDS - 20.0% | |
| AMERICAN MUTUAL FUND, CLASS R-6 | 24,044 |

FIG. 12

TABLE I: BALANCE SHEET

| CONSOLIDATED BALANCE SHEETS (USD $) IN MILLIONS, EXCEPT SHARE DATA IN THOUSANDS, UNLESS OTHERWISE SPECIFIED | DEC. 31, 2014 | DEC. 31, 2013 |
|---|---|---|
| ASSETS | | |
| CASH AND CASH EQUIVALENTS | $1,411 | $1,764 |
| ACCOUNTS RECEIVABLE, NET | 2,652 | 2,929 |
| BILLED PORTION OF FINANCE RECEIVABLES, NET | 110 | 113 |
| FINANCE RECEIVABLES, NET | 1,425 | 1,500 |
| INVENTORIES | 934 | 998 |
| ASSETS OF DISCONTINUED OPERATIONS | 1,260 | 0 |
| OTHER CURRENT ASSETS | 1,082 | 1,207 |
| TOTAL CURRENT ASSETS | 8,874 | 8,511 |
| FINANCE RECEIVABLES DUE AFTER ONE YEAR, NET | 2,719 | 2,917 |
| EQUIPMENT ON OPERATING LEASES, NET | 525 | 559 |
| LAND, BUILDINGS AND EQUIPMENT, NET | 1,123 | 1,466 |
| INVESTMENTS IN AFFILIATES, AT EQUITY | 1,338 | 1,285 |
| INTANGIBLE ASSETS, NET | 2,031 | 2,503 |
| GOODWILL | 8,805 | 9,205 |
| OTHER LONG-TERM ASSETS | 2,243 | 2,590 |
| TOTAL ASSETS | 27,658 | 29,036 |
| LIABILITIES AND EQUITY | | |
| SHORT-TERM DEBT AND CURRENT PORTION OF LONG-TERM DEBT | 1,427 | 1,117 |
| ACCOUNTS PAYABLE | 1,584 | 1,626 |
| ACCRUED COMPENSATION AND BENEFITS COST | 754 | 734 |
| UNEARNED INCOME | 431 | 496 |
| LIABILITIES OF DISCONTINUED OPERATIONS | 371 | 0 |
| OTHER CURRENT LIABILITIES | 1,509 | 1,713 |
| TOTAL CURRENT LIABILITIES | 6,076 | 5,686 |

FIG. 13

TABLE I: BALANCE SHEET

| CONSOLIDATED BALANCE SHEETS (USD $) IN MILLIONS, EXCEPT SHARE DATA IN THOUSANDS, UNLESS OTHERWISE SPECIFIED | DEC. 31, 2014 | DEC. 31, 2013 |
|---|---|---|
| LONG-TERM DEBT | 6,314 | 6,904 |
| PENSION AND OTHER BENEFIT LIABILITIES | 2,847 | 2,136 |
| POST-RETIREMENT MEDICAL BENEFITS | 865 | 785 |
| OTHER LONG-TERM LIABILITIES | 498 | 757 |
| TOTAL LIABILITIES | 16,600 | 16,268 |
| SERIES A CONVERTIBLE PREFERRED STOCK | 349 | 349 |
| COMMON STOCK | 1,124 | 1,210 |
| ADDITIONAL PAID-IN CAPITAL | 4,283 | 5,282 |
| TREASURY STOCK, AT COST | -105 | -252 |
| RETAINED EARNINGS | 9,491 | 8,839 |
| ACCUMULATED OTHER COMPREHENSIVE LOSS | -4,159 | -2,779 |
| XEROX SHAREHOLDERS'™ EQUITY | 10,634 | 12,300 |
| NONCONTROLLING INTERESTS | 75 | 119 |
| TOTAL EQUITY | 10,709 | 12,419 |
| TOTAL LIABILITIES AND EQUITY | $27,658 | $29,036 |
| SHARES OF COMMON STOCK ISSUED | 1,124,354 | 1,210,321 |

FIG. 13
CONTINUED

TABLE II

| INVESTMENT FUND | | AMOUNT |
|---|---|---:|
| BRAHMAN PARTNERS III, L.P. | $ | 7,000,000 |
| BREVAN HOWARD, L.P. | | 10,000,000 |
| CASPIAN SELECT CREDIT FUND, L.P. | | 15,000,000 |
| CORVEX PARTNERS L.P. | | 8,000,000 |
| GLG EUROPEAN LONG-SHORT OFFSHORE FUND Ltd. | | 5,000,000 |
| MAVERICK FUND USA Ltd. | | 8,000,000 |
| PALOMA PARTNERS LLC | | 13,000,000 |
| PAULSON PARTNERS ENHANCED, L.P. | | 5,000,000 |
| YORK CREDIT OPPORTUNITIES FUND, L.P. | | 8,000,000 |
| TOTAL | $ | 79,000,000 |

FIG. 14

TABLE III

| SECTORS | ALGER SPECTRA FUND* | ALGER GREEN FUND | ALGER ANALYST FUND | ALGER DYNAMIC OPPORTUNITIES FUND* |
|---|---|---|---|---|
| CONSUMER DISCRETIONARY | 19.1% | 14.6% | 26.3% | 7.9% |
| CONSUMER STAPLES | 7.0 | 8.1 | 4.4 | 2.8 |
| ENERGY | 5.1 | 1.8 | 6.1 | 1.8 |
| FINANCIALS | 9.5 | 2.4 | 5.0 | 5.4 |
| HEALTH CARE | 10.0 | 7.2 | 12.1 | 2.7 |
| INDUSTRIALS | 10.3 | 20.7 | 9.5 | 5.5 |
| INFORMATION TECHNOLOGY | 28.0 | 32.1 | 22.1 | 11.9 |
| MATERIALS | 3.7 | 7.5 | 8.7 | 1.1 |
| TELECOMMUNICATION SERVICES | 3.1 | 0.0 | 2.5 | 0.5 |
| UTILITIES | 0.0 | 3.7 | 0.0 | 0.0 |
| SHORT-TERM INVESTMENTS AND NET OTHER ASSETS | 4.2 | 1.9 | 3.3 | 60.4 |
|  | 100.0% | 100.0% | 100.0% | 100.0% |

FIG. 15

TABLE IV: SPARSE TABLE WITH MANY 0 VALUES (DASH SIGN)

| | VALUE OPPORTUNITIES | CAPITAL INCOME | HIGH YIELD |
|---|---|---|---|
| LEVEL 1 - QUOTED PRICES IN AN ACTIVE MARKET: | | | |
| COMMON STOCKS | $ 63,642,791 | $ 5,068,961 | $ 2,054,543 |
| INVESTMENT COMPANIES | 603,944 | - | - |
| PREFERRED STOCKS | 2,698,367 | 209,469 | 21,552,533 |
| CONVERTIBLE PREFERRED STOCKS | - | 86,045 | 8,465,734 |
| PURCHASED CALL OPTIONS | 136,400 | - | - |
| PURCHASED PUT OPTIONS | 1,441,000 | - | - |
| WARRANTS | 1,049,558 | 4,813 | 369,902 |
| MONEY MARKET FUNDS | 41,953 | - | - |
| LEVEL 2 - OTHER SIGNIFICANT OBSERVABLE MARKET INPUTS: | | | |
| COMMON STOCKS | 5,312,456 | - | - |
| PREFERRED STOCKS | 633,136 | - | - |
| CONVERTIBLE BONDS | - | 28,025 | 3,155,025 |
| CORPORATE BONDS | 2,371,252 | 3,389,642 | 462,353,822 |
| PURCHASED PUT OPTIONS | 1,002,545 | - | - |
| TIME DEPOSITS | 6,677,480 | 49,286 | 35,965,143 |
| LEVEL 3 - SIGNIFICANT UNOBSERVABLE INPUTS | - | - | - |
| TOTAL INVESTMENTS | $ 85,610,882 | $ 8,836,241 | $ 533,916,702 |
| | | | |
| OTHER FINANCIAL INSTRUMENTS | | | |
| LEVEL 1 - QUOTED PRICES IN AN ACTIVE MARKET | $ - | $ - | $ - |
| LEVEL 2 - OTHER SIGNIFICANT OBSERVABLE MARKET INPUTS: | | | |
| CREDIT DEFAULT SWAP CONTRACTS* | - | - | (19,603) |
| LEVEL 3 - SIGNIFICANT UNOBSERVABLE INPUTS: | - | - | - |
| TOTAL OTHER FINANCIAL INSTRUMENTS | $ - | $ - | $ (19,603) |

FIG. 16

METHOD AND SYSTEM FOR EXTRACTING MATHEMATICAL STRUCTURES IN TABLES

CROSS REFERENCE TO RELATED PATENTS AND APPLICATIONS

U.S. patent application Ser. No. 14/955,410, filed Dec. 1, 2015, by Hervé Déjean and entitled "METHOD AND SYSTEM FOR GENERATING A GRAPHICAL ORGANIZATION OF A PAGE";

U.S. patent application Ser. No. 14/475,809, filed Sep. 3, 2014, U.S. Publication No. 2016/0063322, published Mar. 3, 2016, by Hervé Déjean et al. and entitled "METHOD AND SYSTEM OF EXTRACTING LABEL:VALUE DATA FROM A DOCUMENT";

U.S. patent application Ser. No. 13/484,708, filed May 31, 2012, U.S. Publication No. 2013/0321867, published Dec. 5, 2013, by Hervé Déjean and entitled "TYPOGRAPHICAL BLOCK GENERATION";

U.S. Pat. No. 9,008,443, issued Apr. 14, 2015, by Hervé Déjean and entitled "SYSTEM AND METHOD FOR IDENTIFYING REGULAR GEOMETRIC STRUCTURES IN DOCUMENT PAGES";

U.S. patent application Ser. No. 13/911,452, filed Jun. 6, 2013, U.S. Publication No. 2014/0365872, published Dec. 11, 2014, by Hervé Déjean and entitled "METHODS AND SYSTEMS FOR GENERATION OF DOCUMENT STRUCTURES BASED ON SEQUENTIAL CONSTRAINTS";

U.S. Pat. No. 9,189,461, issued Nov. 17, 2015, by Hervé Déjean and entitled "PAGE FRAME AND PAGE COORDINATE DETERMINATION METHOD AND SYSTEM BASED ON SEQUENTIAL REGULARITIES"; and U.S. patent application Ser. No. 14/107,333, filed Dec. 16, 2013, U.S. Publication No. 2015/0169510, Published Jun. 18, 2015, by Hervé Déjean et al. and entitled "METHOD AND SYSTEM OF EXTRACTING STRUCTURED DATA FROM A DOCUMENT", are incorporated herein by reference in their entirety.

BACKGROUND

The exemplary embodiments disclosed herein relate to document processing and find particular application in connection with a method and system for extracting a mathematical structure associated with a financial table included in a financial document.

While the use of electronically created and recorded documents is prevalent, many such electronic documents are in a form that does not permit them to be used other than for viewing or printing. To provide greater accessibility to the content of such documents, it is desirable to understand their structure. However, when electronic documents are recovered by scanning a hardcopy representation or by recovering an electronic representation, e.g., PDF (Portable Document Format) or Postscript representation, a loss of document structure usually results because the representation of the document is either at a very low level, e.g., bitmap, or an intermediate level, e.g., a document formatted in a page description language or a portable document format.

Geometric or physical page layout analysis can be used to recognize the different elements of a page, often in terms of text regions and image regions. Methods are known for determining a document's logical structure, or the order in which objects are laid out on a document image, i.e., layout objects. Such methods exploit the geometric or typographical features of document image objects, sometimes using of the content of objects and a priori knowledge of page layout for a particular document class. Geometric page layout analysis (GPLA) algorithms have been developed to recognize different elements of a page, often in terms of text blocks and image blocks. Examples of such algorithms include the X-Y Cut algorithm, described by Nagy et al., "A PROTOTYPE DOCUMENT IMAGE ANALYSIS SYSTEM FOR TECHNICAL JOURNALS", CSE Journal Article, Department of Computer Science and Engineering, pages 10-22, July, 1992 and the Smearing algorithm, described by Wong et al., "Document analysis system", IBM Journal of Research and Development, volume 26, No. 6, pages 647-656, November, 1982. These GPLA algorithms receive as input a page image and perform a segmentation based on information, such as pixel information, gathered from the page. These approaches to element recognition are either top-down or bottom-up and mainly aim to delimit boxes of text or images in a page. These methods are useful for segmenting pages one dimensionally, into columns.

In addition, as disclosed in U.S. patent application Ser. No. 13/911,452, filed Jun. 6, 2013, U.S. Publication No. 2014/0365872, published Dec. 11, 2014, by Hervé Déjean; entitled "METHODS AND SYSTEMS FOR GENERATION OF DOCUMENT STRUCTURES BASED ON SEQUENTIAL CONSTRAINTS", a method and system is provided that structures a sequentially-ordered set of elements, each being characterized by a set of features. N-grams, i.e., a sequence of n features, are computed from a set for n contiguous elements, and n-grams which are repetitive, e.g., Kleene cross, are selected. Elements matching the most frequent repetitive n-gram are grouped together under a new node, and a new sequence is created. The method is iteratively applied to this new sequence. The output is an ordered set of trees.

A common task in document analysis is extracting data from an unstructured document, sometimes referred to as indexing. The extracted data can correspond to a single piece of text, such as an invoice number, or to structured data including several fields, such as an invoice item having a description, price per unit, total amount, etc.

As disclosed in U.S. patent application Ser. No. 14/955,410, filed Dec. 1, 2015, by Hervé Déjean and entitled "METHOD AND SYSTEM FOR GENERATING A GRAPHICAL ORGANIZATION OF A PAGE", this structured data is referred to as sdata (structured data) and a primary issue in extracting structured data is the lack of correspondence between the sdata/data fields and the way their layout is performed, except for documents which mostly follow a layout template such as forms. In some documents, one homogeneous block can contain all the data fields. In another document, each field may be spread over table cells. No generic algorithm can systematically provide segmentation where found layout elements correspond to a single sdata. An analysis combining layout information and content information is then required to identify complete sdata. U.S. patent application Ser. No. 14/955,410, filed Dec. 1, 2015, by Hervé Déjean and entitled "METHOD AND SYSTEM FOR GENERATING A GRAPHICAL ORGANIZATION OF A PAGE" provides a method and system to generate a graphical organization of a page which can then be further processed to extract data or perform other processing to extract information from the generated graphical organization descriptions.

With regard to the extraction of financial data, manners of extracting financial data from unstructured tabular document are provided by U.S. Pat. No. 5,893,131, by Kornfeld, issued Apr. 6, 1999 and entitled "METHOD AND APPARATUS FOR PARSING DATA"; U.S. Pat. No. 6,336,094 by Ferguson et al., issued Jan. 1, 2002 and entitled "METHOD FOR ELECTRONICALLY RECOGNIZING AND PARSING INFORMATION CONTAINED IN A FINANCIAL STATEMENT"; U.S. Pat. No. 7,653,871, by LaComb et al., issued Jan. 26, 2010 and entitled "MATHEMATICAL DECOMPOSITION OF TABLE-STRUCTURED ELECTRONIC DOCUMENTS"; and U.S. Pat. No. 7,856,388, by Srivastava et al., issued Dec. 21, 2010 and entitled "FINANCIAL REPORTING AND AUDITING AGENT WITH NET KNOWLEDGE FOR EXTENSIBLE BUSINESS REPORTING LANGUAGE". These patents all address data extraction from financial documents, and more precisely, data presented in the financial statements such as balance sheets, cash flow statements, and income statements for U.S. public companies. Almost all financial statements are organized by accounting categories including assets, liabilities, and equities for balance sheets. This taxonomy is often hierarchical, including 7 levels and more for some financial tables. Table 1 shown in FIG. 13 provides an example of a financial statement including balance sheets. Beyond the traditional issue of layout analysis table extraction to delimit the table and recognize the internal structure of the table in row and columns, a financial table understanding process must basically categorize the financial data into line items and identify (sub-)totals included in the table. It is valuable to detect the mathematical structure since it reflects the hierarchical row organization, where a subtotal is linked to a sub-category.

In order to detect the mathematical structure associated with a financial table, all the above mentioned methods, except U.S. Pat. No. 5,893,131, by Kornfeld, issued Apr. 6, 1999 and entitled "METHOD AND APPARATUS FOR PARSING DATA", are mainly based on keywords and use mathematical properties in order to validate a posteriori the resulting structure. In other words, these methods determine if a total really corresponds to the sum of the elements of its section. Detection of a "Total Line" is often based on keyword such as 'total' or based on the fact that the line item has no label. Each method processes multi-lines items with its own set of heuristics, based on textual and typographical features.

In order to detect mathematical relationships, U.S. Pat. No. 7,653,871, by LaComb et al., issued Jan. 26, 2010 and entitled "MATHEMATICAL DECOMPOSITION OF TABLE-STRUCTURED ELECTRONIC DOCUMENTS" uses a top-down approach with strong prior knowledge, where only a balance sheet statement is covered, knowing its three main top categories (assets, liabilities, equities). Others use a greedy approach which can be used when then number of elements is not too large. See U.S. Pat. No. 7,856,388, by Srivastava et al., issued Dec. 21, 2010 and entitled "FINANCIAL REPORTING AND AUDITING AGENT WITH NET KNOWLEDGE FOR EXTENSIBLE BUSINESS REPORTING LANGUAGE". All these methods focus on a specific financial statement: Balance Sheet and addressing other tables involves updating lexical resources.

Provided herein is a method and system of extracting a mathematical structure associated with a financial document, i.e., financial table, which is not limited to a specific type of financial document, such as a balance sheet, cash flow statement, etc.

INCORPORATION BY REFERENCE

U.S. patent application Ser. No. 14/955,410, filed Dec. 1, 2015, by Hervé Déjean, and entitled "METHOD AND SYSTEM FOR GENERATING A GRAPHICAL ORGANIZATION OF A PAGE";

U.S. Patent Publication No. 2002/0178183, published Nov. 28, 2002, by Meding, and entitled "DATA EXTRACTION METHOD AND APPARATUS";

U.S. Patent Publication No. 2004/0194009, published Sep. 30, 2004, by LaComb et al., and entitled "AUTOMATED UNDERSTANDING, EXTRACTION AND STRUCTURED REFORMATTING OF INFORMATION IN ELECTRONIC FILES";

U.S. Patent Publication No. 2016/0063322, Published Mar. 3, 2016, by Hervé Déjean et al., and entitled "METHOD AND SYSTEM OF EXTRACTING LABEL VALUE DATA FROM A DOCUMENT";

U.S. Pat. No. 5,893,131, issued Apr. 6, 1999, by Kornfeld, and entitled "METHOD AND APPARATUS FOR PARSING DATA";

U.S. Pat. No. 6,006,240, issued Dec. 21, 1999, by Handley, entitled "CELL IDENTIFICATION IN TABLE ANALYSIS";

U.S. Pat. No. 6,336,094, by Ferguson et al., issued Jan. 1, 2002, and entitled "METHOD FOR ELECTRONICALLY RECOGNIZING AND PARSING INFORMATION CONTAINED IN A FINANCIAL STATEMENT";

U.S. Pat. No. 7,653,871, issued Jan. 26, 2010, by LaComb et al., and entitled "MATHEMATICAL DECOMPOSITION OF TABLE-STRUCTURED ELECTRONIC DOCUMENTS";

U.S. Pat. No. 7,668,372, issued Feb. 23, 2010, by Matthias Schiehlen, and entitled "METHOD AND SYSTEM FOR COLLECTING DATA FROM A PLURALITY OF MACHINE READABLE DOCUMENTS";

U.S. Pat. No. 7,752,538, issued Jul. 6, 2010, by Vion-Dury, and entitled "GRAPHICAL SYNTAX ANALYSIS OF TABLES THROUGH TREE REWRITING";

U.S. Pat. No. 7,856,388, issued Dec. 21, 2010, by Srivastava et al., and entitled "FINANCIAL REPORTING AND AUDITING AGENT WITH NET KNOWLEDGE FOR EXTENSIBLE BUSINESS REPORTING LANGUAGE";

U.S. Pat. No. 8,270,721, issued Sep. 18, 2012, by Matthias Schiehlen, and entitled "METHOD AND SYSTEM FOR ACQUIRING DATA FROM MACHINE-READABLE DOCUMENTS";

BARTOLI et al., article entitled "SEMISUPERVISED WRAPPER CHOICE AND GENERATION FOR PRINT-ORIENTED DOCUMENTS", Department of Engineering and Architecture (DIA), University of Trieste, Via Valerio 10, 34127 Trieste, Italy, IEEE Transactions on Knowledge and Data Engineering, Vol. 26, No. 1, January 2014, pages 208-220;

BELAÏD et al., article entitled "Morphological Tagging Approach in Document Analysis of Invoices", 17th International Conference on Pattern Recognition (ICPR'2004). (Cambridge, UK). IEEE, 2004. pages 469-472;

COÜASNON et al., "RECOGNITION OF TABLES AND FORMS", Handbook of Document Image Processing and Recognition, Doermann and Tombre (Eds), Springer-Verlag, London, pages 647-667, 2014;

COÜASNON, "DMOS, A GENERIC DOCUMENT RECOGNITION METHOD: APPLICATION TO TABLE STRUCTURE ANALYSIS IN A GENERAL AND INA SPECIFIC WAY", Int J Doc Anal Recognit 8, pages 111-122;

EMBLEY et al., "TABLE-PROCESSING PARADIGMS: A RESEARCH SURVEY", Int J Doc Anal Recognit 8, pages 66-86, January 2005;

FANG et al., "A TABLE DETECTION METHOD FOR MULTIPAGE PDF DOCUMENTS VIA VISUAL SEPARATORS AND TABULAR STRUCTURES", International Conference on Document Analysis and Recognition, ICDAR 2011;

JANSSEN et al., article entitled "RECEIPTS2GO: THE BIG WORLD OF SMALL DOCUMENTS", In Proceedings of the 2012 ACM symposium on Document Engineering (DocEng '12), Sep. 4-7, 2012, 4 pages;

KNUTH, D. E., "ON THE TRANSLATION OF LANGUAGES FROM LEFT TO RIGHT", Information and Control 8, 607-639, July, 1965;

NAGY et al., "A PROTOTYPE DOCUMENT IMAGE ANALYSIS SYSTEM FOR TECHNICAL JOURNALS", CSE Journal Article, Department of Computer Science and Engineering, pages 10-22, July, 1992;

RAMEL et al., "DETECTION, EXTRACTION AND REPRESENTATION OF TABLES", Seventh International Conference on Document Analysis and Recognition, 2003;

SILVA et al., "DESIGN OF AN END-TO-END METHOD TO EXTRACT INFORMATION FROM TABLES", pages 1-47;

"SPECIAL ISSUE ON DETECTION AND UNDERSTANDING OF TABLES AND FORMS FOR DOCUMENT PROCESSING APPLICATIONS", International Journal of Document Analysis, Springer-Verlag 2006, published online Apr. 7, 2006;

U.S. Securities and Exchange Commission, http://www.sec.gov/Archives/edgar/data/729528/000005193112000789/afis_nq.htm;

WONG et al., The Smearing algorithm, "Document analysis system", IBM Journal of Research and Development, volume 26, No. 6, pages 647-656, November, 1982; and ZANIBBI et al., "A SURVEY OF TABLE RECOGNITION: MODELS, OBSERVATIONS, TRANSFORMATIONS, AND INFERENCES," Oct. 24, 2003, are incorporated herein by reference in their entirety.

BRIEF DESCRIPTION

In one embodiment of this disclosure, described is a computer-implemented method of extracting a mathematical structure representation of a digital version of a financial table associated with a financial document using a document processing system including a memory and a processor communicatively coupled to the memory for performing the method, the method comprising: a) detecting a financial table included in the financial document, the financial table including a plurality of line items organized in columns and rows, each line item associated with a row and one or more columns, each row including a value label associated with a first column and a respective value associated with a second column; b) extracting a first value associated with the second column; c) shifting the extracted first value to a top location of a LR-(Left-to-Right) parser reducing stack and shifting the extracted first value to a top location of a nonreducing stack; d) extracting a second value associated with the second column; e) shifting the extracted second value to the top location of the LR-parser reducing stack directly above the first value, and shifting the extracted second value to the top location of the nonreducing stack directly above the first value; f) determining if the second value shifted to the top location of the LR-parser reducing stack is a sum of any sequential preceding values below in the LR-parser reducing stack or nonreducing stack and if the second value shifted to the top location of the LR-parser reducing stack is a sum of any sequential values below in the LR-parser reducing stack or nonreducing stack, eliminating the sequential preceding values below in the LR-parser reducing stack which provide the sum and retaining the second value shifted to the top location of the LR-parser reducing stack which is the sum, while retaining all sequential preceding values below in the nonreducing stack; g) repeating steps d)-f) for all sequential values included in the second column of the financial table to generate a final LR-parser reduced stack; and h) processing the final reducing stack to generate a mathematical structure associated with the second column.

In another embodiment of this disclosure, described is a document processing system for generating a mathematical structure representation of a digital version of a financial table associated with a financial document, the document processing system comprising: a financial table detection module configured to detect a financial table included in the financial document, the financial table including a plurality of line items organized in columns and rows, each line item associated with a raw and one or more columns, each row including a value label associated with a first column and a respective value associated with a second column; an extraction module configured to sequentially extract a plurality of values associated with the second column; a nonreducing stack module configured to sequentially process a plurality of extracted values associated with the second columns to generate a nonreduced stack of the extracted values; a LR-(Left-to-Right) parser reducing stack module configured to sequentially process the plurality of extracted values associated with the second column to generate a reduced stack of the extracted values; and a mathematical structure generation module configured to generate a mathematical structure associated with the second column, wherein one or more of the financial table detection module, the extraction module, the nonreducing stack module, the LR-parser reducing sack module and the mathematical structure generation module are configured to perform: a) detecting a financial table included in the financial document, the financial table including a plurality of line items organized in columns and rows, each line item associated with a row and one or more columns, each row including a value label associated with a first column and a respective value associated with a second column; b) extracting a first value associated with the second column; c) shifting the extracted first value to a top location of a LR-(Left-to-Right) parser reducing stack and shifting the extracted first value to a top location of a nonreducing stack; d) extracting a second value associated with the second column; e) shifting the extracted second value to the top location of the LR-parser reducing stack directly above the first value, and shifting the extracted second value to the top location of the nonreducing stack directly above the first value; f) determining if the second value shifted to the top location of the LR-parser reducing stack is a sum of any sequential preceding values below in the LR-parser reducing stack or nonreducing stack and if the second value shifted to the top location of the LR-parser reducing stack is a sum of any sequential values below in the LR-parser reducing stack or nonreducing stack, eliminating the sequential preceding values below in the LR-parser reducing stack which provide the sum and retaining the second value shifted to the top location of the LR-parser reducing stack which is the sum, while retaining all sequential preceding values below in the nonreducing stack; g) repeating steps d)-f) for all sequential values included in the second column of the financial table to generate a final LR-parser reduced stack; and h) processing the final reducing stack to generate a mathematical structure associated with the second column.

In still another embodiment of this disclosure, described is a computer-implemented method of extracting a mathematical structure representation of a digital version of a financial table associated with a financial document using a document processing system including a memory and a processor communicatively coupled to the memory for performing the method, the method comprising: a) detecting a financial table included in the financial document, the financial table including a plurality of line items organized in columns and rows, each line item associated with a row and one or more columns, each row including a value label associated with a first column and a respective value associated with a second column; b) associating the first value with a first location of a LR-(Left-to-Right) parser reducing stack, and associating the first value with a first location of a nonreducing flat stack; c) associating the second value with a second location of the LR-parser reducing stack, and associating the second value with a second location of the nonreducing flat stack; d) determining if the second value associated with the LR-parser reducing stack is a sum of any sequential preceding values in the LR-parser reducing stack or nonreducing stack, and if the second value associated with the LR-parser reducing stack is a sum of any sequential preceding values in the LR-parser reducing stack or nonreducing stack, eliminating the sequential preceding values associated with the LR-parser reducing stack which provide the sum and retaining the second value associated with the first location of the LR-parser reducing stack which is the sum, while retaining all sequential preceding values associated with the nonreducing stack; e) repeating steps c) and d) for all sequential values included in the second column of the financial table to generate a final sequential series of final values associated with a final LR-parser reduced stack; and f) processing the final values associated with the final LR-parser reduced stack to generate a mathematical structure associated with the second column.

BRIEF DESCRIPTION OF THE DRAWINGS

FIG. 5 shows an initial mathematical column extracted from a detected table in a document according to an exemplary embodiment of this disclosure.

FIG. 6 shows the execution of a normal single stack, LR-parser to extract a mathematical structure representation from the mathematical column extracted shown in FIG. 5.

FIG. 7 shows the execution of a multi-stack parser extracting a mathematical structure representation from the mathematical column extracted shown in FIG. 5 according to an exemplary embodiment of this disclosure.

FIG. 9 is an example of a financial table processed to extract a mathematical structure according to an exemplary embodiment of this disclosure.

FIG. 10 shows the extraction of numerical tables only from the initial financial table shown in FIG. 9 according to an exemplary embodiment of this disclosure.

FIG. 11 shows a hierarchical mathematical structure extracted from the numerical table shown in FIG. 10 according to an exemplary embodiment of this disclosure.

FIG. 12 shows the resulting structural table associated with the financial table shown in FIG. 9, based on the hierarchical mathematical structure extracted according to FIG. 11.

FIG. 13 shows Table I, which is an example financial balance sheet.

FIG. 14 shows Table II, which is an example of a financial table including a 'local' sum in a short table.

FIG. 15 shows Table III, which is an example of a financial table including a 'local' sum with 4 operands.

FIG. 16 shows Table IV, which is an example of a sparse financial table with several 0 values, represented as dash signs.

DETAILED DESCRIPTION

Figure 1:
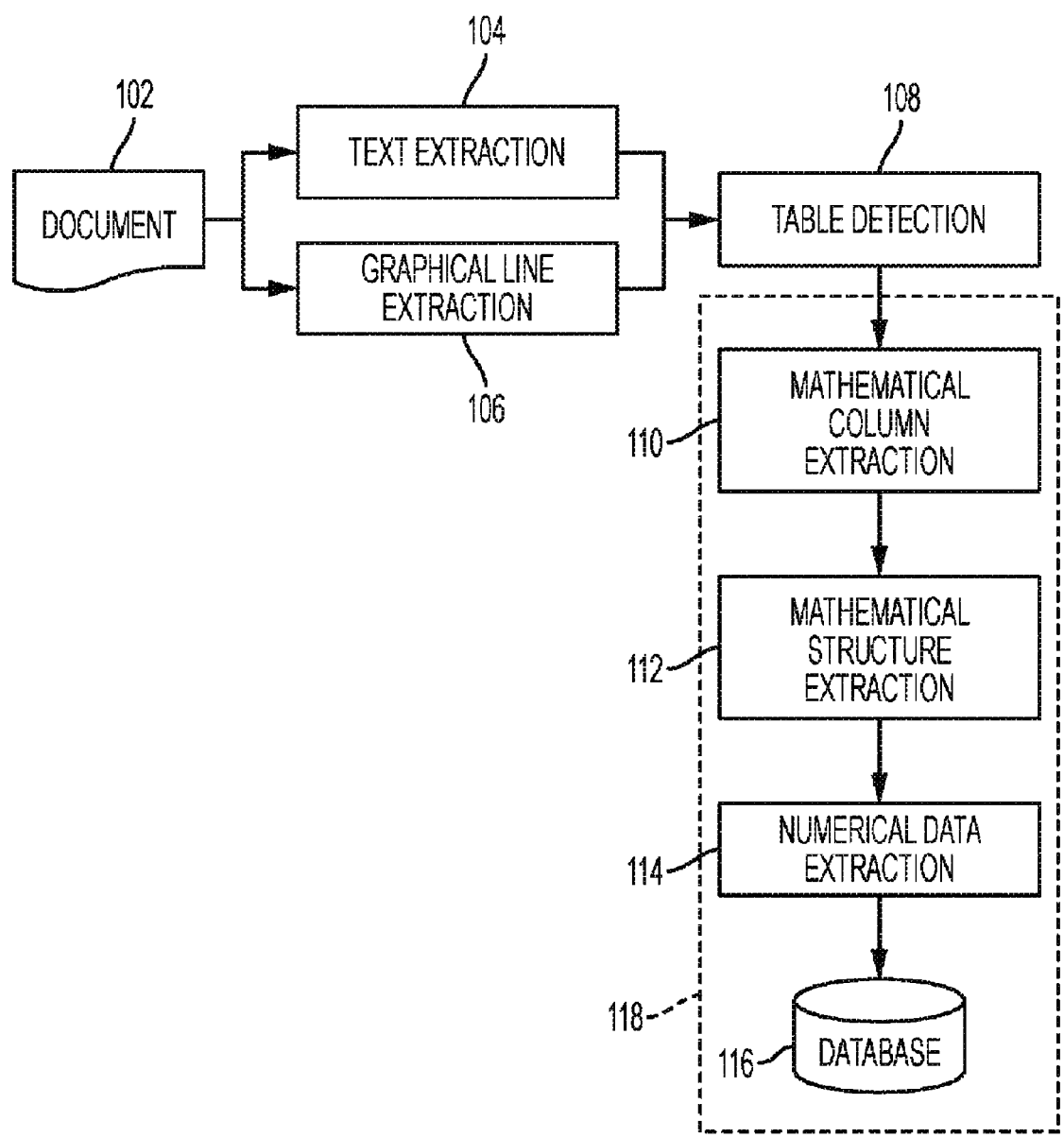
FIG. 1 is a flow chart of a method of extracting a mathematical structure representation of a digital version of a financial table according to an exemplary embodiment of this disclosure.

Disclosed herein is a method and system for automatically extracting mathematical structures from an unstructured document. Specifically, the focus is on numerical data represented in a tabulated form. While the referenced literature proposes an elegant solution based on a LR-parser, i.e., normal LR-parser, this disclosure demonstrates that this solution fails when processing some types of numerical tables. See U.S. Pat. No. 5,893,131, by Kornfeld, issued Apr. 6, 1999 and entitled "METHOD AND APPARATUS FOR PARSING DATA". The method and system provided in this disclosure uses multi-stacks which is an extension of the Kornfeld U.S. Pat. No. 5,893,131.

As discussed in the background, U.S. Pat. No. 5,893,131, by Kornfeld, issued Apr. 6, 1999 and entitled "METHOD AND APPARATUS FOR PARSING DATA" proposes an approach to detect mathematical structures from a set of numbers. Since the financial domain is the focus, only addition and subtraction are considered as operators, with some strong restrictions for the subtraction operator, where the number of operands is limited to 2 which works well for balance sheets. The method disclosed in Kornfeld is relatively simple, using a simple non-backtracking Left-Right parser in order to detect sums. See KNUTH, D. E., "ON THE TRANSLATION OF LANGUAGES FROM LEFT TO RIGHT", Information and Control 8, 607-639, July, 1965. Numbers of a column are added one by one in a stack; and when a new element is processed, a test is performed: does this element correspond to the sum of some n top elements of the stack?

If yes, these n elements are removed and replaced by the new element, which is referred to as a reduce operation.

If not; the element is added on top of the stack and the next element is processed, which is referred to as a shift operation.

Here is the explanation of the use of the LR-parser for this problem:

"A shift operation transfers a token corresponding, then, to a line of the financial statement, to the top of the stack. A reduce operation takes some number of units at the top of the stack and reduces to a compound. A sum-type compound is reduced if the unit at the top of the stack is the vector sum of two or more units directly beneath it. The algorithm terminates successfully if there is only one unit at the top of the stack, corresponding to the desired parse tree, and the label of that unit is consistent with the kind of statement being parsed. If the parser reaches the final token in the input buffer and has not terminated successfully, then it terminates with failure." See U.S. Pat. No. 5,893,131, by Kornfeld, issued Apr. 6, 1999 and entitled "METHOD AND APPARATUS FOR PARSING DATA".

This normal single stack LR-parser method allows for detecting hierarchical mathematical structures of subtotals with an arbitrary level of sub-operations. Basically the table is seen as an equation, whose operands and intermediate results correspond to table rows. Subtraction is performed in an ad hoc way: only the last top two elements in the stack are considered, which hard-codes Balance Sheet equations. See U.S. Pat. No. 5,893,131, by Kornfeld, issued Apr. 6, 1999 and entitled "METHOD AND APPARATUS FOR PARSING DATA". The normal single stack LR-parser method mostly targets a specific financial statement, i.e., Balance Sheet, and assumes one single equation including a grand total which is present in the table. It is very simple, elegant and efficient for balance sheets, but it fails for other financials tables, especially for the scenarios described below.

a) a=a problem: Two consecutive identical numbers can be considered as:

Either operands of the same equation.

The second can be considered as the 'total' of an operation only composed of the other number. This is a common pattern used in financial tables (see Table IV of FIG. 16; last column, last rows [19,603]).

Wrong sub-sum: A sub sequence of the operands of a sum matches the sum constraint (see Table II of FIG. 14, 5,000+8,000=13,000). This is not so frequent (1-2%), but for tables with more than 100 lines, the frequency increases 20% which is very problematic. As Table III of FIG. 15 shows, tables with percentages which generally include small values are another type of table which is more frequently impacted.

b) 0=0+0 Problem: This generally includes a sub-problem of the a=a problem. Sparse tables are difficult to process, where some tables are mostly empty with zeros, and thus the algorithm is unable to detect operations. Table V shown in FIG. 16 provides an example of Asset Valuation table, where investments must be categorized into three levels. Zero values are represented by a dash and are frequent, and some columns cannot be used to detect the mathematical structure of the table, where zero values are common to the three columns.

To accommodate the scenarios described above, provided is a method and system of extracting a mathematical structure of a financial table including:

1) extracting the mathematical structures of a table, by modifying the LR-parser to use multiple stacks; and 2) handling multi-column tables in order to deal with sparse/empty columns.

The basic LR-parser method is modified as follows:

Instead of using one single stack; a list of stacks is used and an efficient backtracking procedure is introduced which is limited, but not optimal. A naïve and optimal (in terms of result) solution is to store all decisions and backtrack when the parsing fails, requiring the analyses of all rows. But in terms of computational efficiency, this solution is not practically operational where some table processing may take several dozens of minutes, even hours in some worst cases.

It has been found that the most efficient and optimal way is to use additional stacks which correspond to stack where some dubious operations (reduce) are not performed, the most dubious case being a=a, as described above. One specific stack simply corresponds to a stack where no reduce operation is performed, i.e., the 'flat' stack, where any decision is dubious.

The 'normal' stack, where reduce operations are performed, is first tested. When an operation is found in this stack, the reduce operation is performed, as in a normal LR-parser.

When no reduce operation is found in this stack for the current element, the other stacks are tested, the 'flat' stack being tested last. If an operation is found in one of these stacks, the normal stack is updated accordingly, potentially 'backtracking' some decisions and the flat stack is left unchanged.

With reference to FIG. 1, shown is a flow chart of a method of extracting a mathematical structure representation of a digital version of a financial table according to an exemplary embodiment of this disclosure.

Initially, a document is processed 102 to extract text 104 and extract graphical lines 106 for mathematical table detection 108.

Next, after a mathematical table has been detected, the method performs extractions of a mathematical structure 118 associated with the financial table detected, including:

Extracting one or more mathematical columns included in the detected financial table 110;

Extracting a structure associated with the mathematical columns 112;

Extracting the numerical data associated with the extracted structure 114; and

Storing the extracted numerical data 116.

Figure 2:
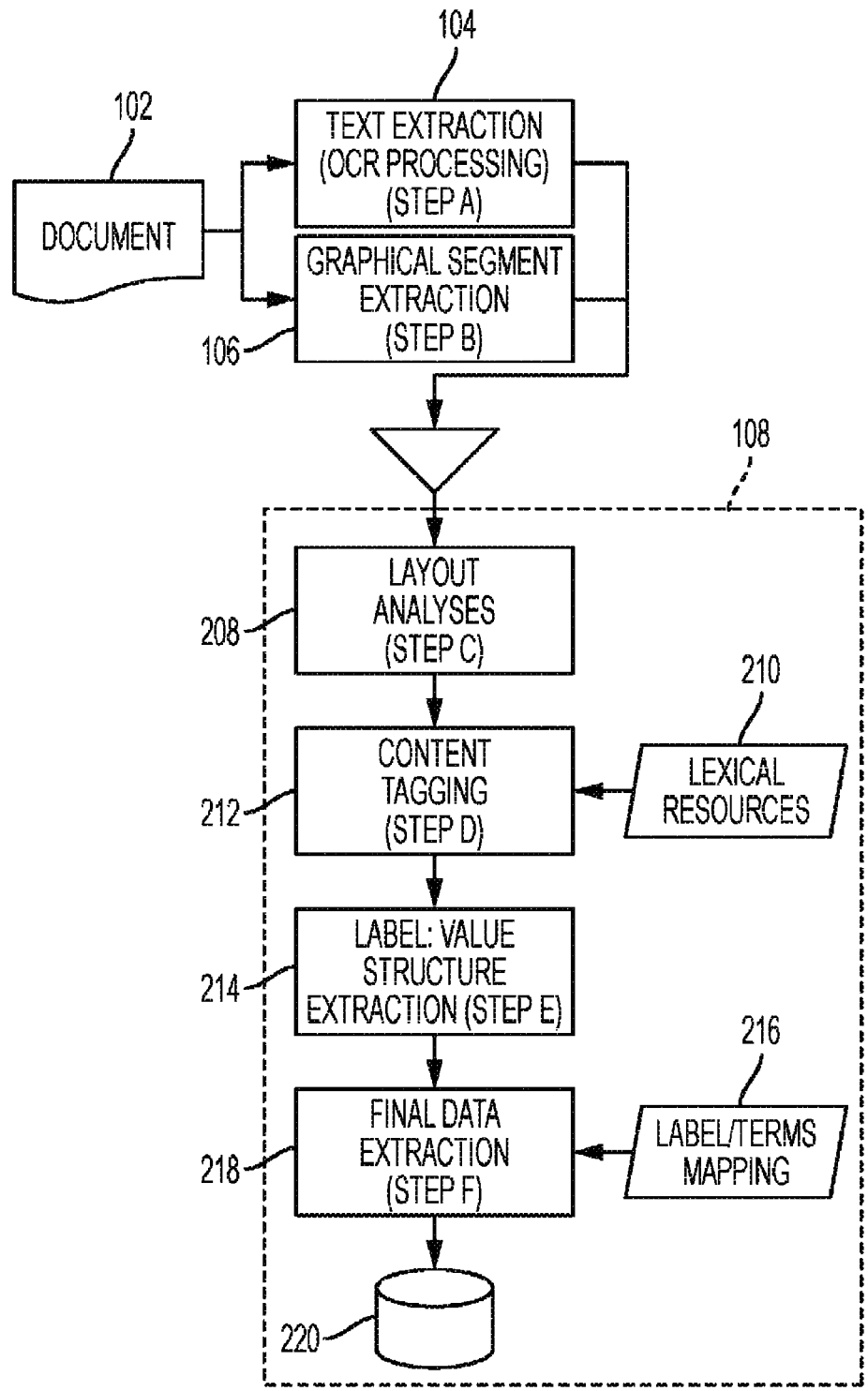
FIG. 2 is a flow chart of a method of extracting a label:value structure associated with a financial table included in a document, the extracted label:value structure subsequently processed according to an exemplary embodiment of this disclosure to extract a mathematical structure representation of the financial table.

FIG. 2 is a flow chart of a method of extracting a label:value structure associated with a financial table included in a document, the extracted label:value structure subsequently processed according to an exemplary embodiment of this disclosure to extract a mathematical structure representation of the financial table. See U.S. patent application Ser. No. 14/955,410, filed Dec. 1, 2015, by Hervé Déjean and entitled "METHOD AND SYSTEM FOR GENERATING A GRAPHICAL ORGANIZATION OF A PAGE". With reference to FIG. 2, described now are the steps of an exemplary method of extracting label:value pairwise data.

Step A) Text extraction 204: optical character recognition (OCR) for document image, text extraction through an Application Programming Interface (API) for a digital document 202 such as PDF.

Step B) Graphical segments extraction 206: image analysis for document image or extraction through an API for digital document 202.

Step C) Layout Analysis 208: several layout analyses are performed, using content and graphical lines.

Step D) Content tagging 212: content is tagged in order to identify labels and values occurrences. Lexical resources 210 provide a list of predefined terms used to tag label candidates.

Step E) Label:value structure extraction 214: using the sequence-based algorithm, all label:value structures are extracted.

Step F) Final information extraction 218: using a mapping table 216, extracted label:value data is associated with targeted data, i.e., data selected for extraction and stored on a data storage device 220.

Figure 3:
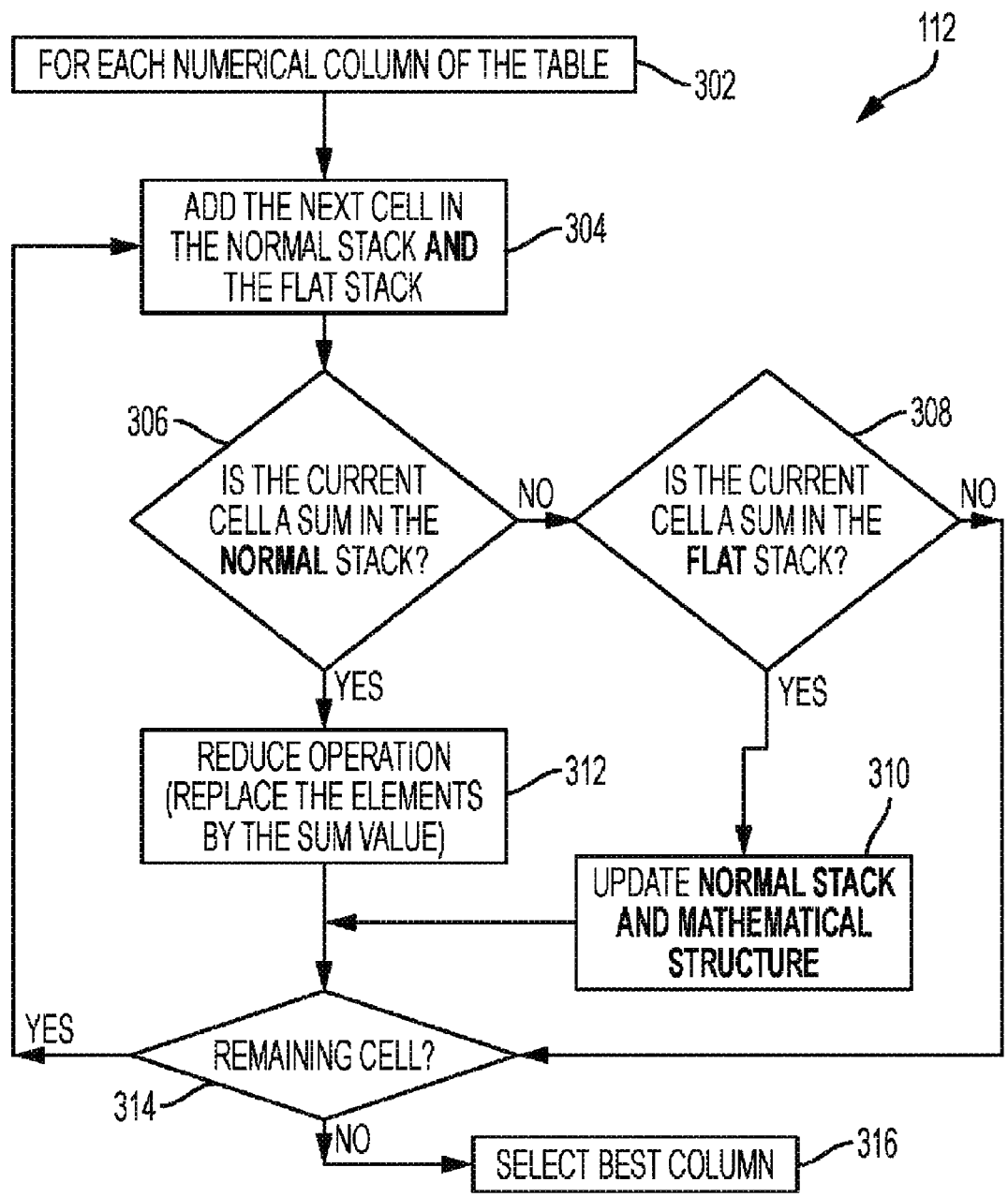
FIG. 3 is a flow chart of a method of extracting a mathematical structure representation of a detected financial table from an extracted mathematical column of the detected financial table according to an exemplary embodiment of this disclosure.

FIG. 3 is a flow chart of a method of extracting a mathematical structure representation of a detected financial table from an extracted mathematical column of the detected financial table according to an exemplary embodiment of this disclosure. With reference to FIG. 3, for each numerical column of the table 302, the method adds the next cell in the normal stack and the flat stack 304.

Next, the method determines if the current cell is a sum in the normal stack 306.

If the current cell is a sum in the normal stack, the method proceeds to perform a reduce operation where the elements are replaced by the sum value 312.

Next, the method returns to step 304 if there are remaining cells to process 314.

If the current cell is not a sum in the normal stack, the method proceeds to determine if the current cell is a sum in the flat stack 308. If the current cell is a sum in the normal stack, the normal stack and associated mathematical structure are updated 310, and the method returns to step 304 if there are remaining cells to process 314. If the current cell is not a sum in the flat stack, the method returns to step 304 if there are remaining cells to process 314.

After all cells have been processed, the method selects the best column 316.

Figure 4:
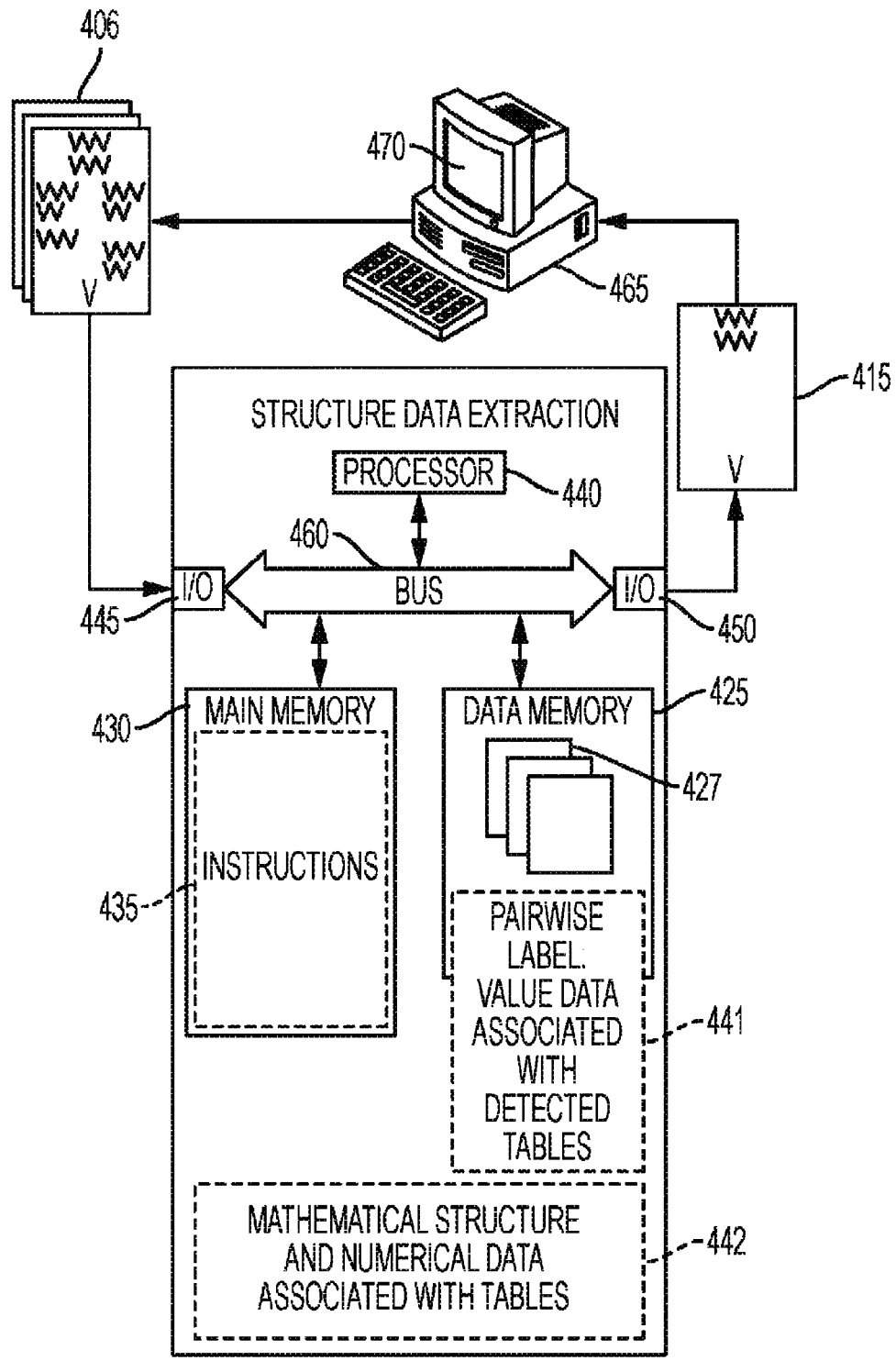
FIG. 4 is a block diagram of a document processing system for generating a mathematical structure representation of a financial table according to an exemplary embodiment of this disclosure.

FIG. 4 is a block diagram of a document processing system for generating a mathematical structure representation of a financial table according to an exemplary embodiment of this disclosure. With reference to FIG. 4, illustrated is an exemplary system extracting data from a document 406 according to the exemplary methods described herein, and subsequently extracting a mathematical structure. The system takes as input a document 406 which includes one or more document pages, i.e., financial statements. The system outputs 415 a hierarchical mathematical structure extracted from the document 406 which have been identified on a document, i.e., table, and stored in data memory 425.

The exemplary system may include one or more specific or general purpose computing devices. The system receives, as input, document 406 and stores the document in data memory 425, as a digital representation 427 during processing. The document is received in electronic form and can be, for example, one or more invoices. The exemplary document is in a page description language, such as a PDF, Portable Document Format (ADOBE SYSTEMS®) file, although other unstructured documents are also contemplated, such as PostScript (ADOBE SYSTEMS®), PCL, Printer Command Language (HEWLETT-PACKARD®), such as PCL-5, PCL-5E, PCL-6, PCL-XL, TIFF, BMP, Word document, or the like. In PDF, for example, each page of a document set is assigned a set of elements, such as text elements and graphical elements, and their respective sizes and locations are identified in a job ticket. The exemplary document includes one or more pages, each of which may be processed independently by the system. The page(s) may each include text, images, or combinations thereof. Images can be photographs, graphics, etc.

Main memory 430 of the system 405 stores instructions 435 for performing the exemplary method. These instructions 435 are implemented by an associated processor 440, such as the computer's CPU. The computer communicates with external devices via one or more input/output devices 445, 450. The hardware components 425, 430, 440, 445, 450 are communicatively linked by a data/control bus 460.

Data memory 425 stores Pairwise label:value data associated with detected tables 441 and mathematical structure and numerical data associated with the detected tables 442.

While a collection of documents could be processed, rather than a single document, the exemplary method is also suited to processing documents singly. Prior to inputting, the document pages may be stored in any suitable tangible storage media such as a disk, ROM or RAM, or may be input into the system in the form of a carrier wave, e.g., via the Internet. The input device may include a modem link, a wired or wireless connection, USB port, floppy or hard disk receiver, or the like and may be separated or combined with other components of the system. While the illustrated source of the document is a client computing device 465, which may be similarly configured to computer 420, except as noted, it will be appreciated that the document may be input from a scanner, or other digital image capture device, with an associated Optical Character Recognition (OCR) engine for processing the output of the scanner to generate the pages of document, or from a disk, flash drive or other memory storage device.

The system may comprise one or more computing devices such as a personal computer, PDA, laptop computer, server computer, or combination thereof. Memories 425, 430 may be integral or separate and may represent any type of non-transitory computer readable medium such as random access memory (RAM), read only memory (ROM), magnetic disk or tape, optical disk, flash memory, or holographic memory. In one embodiment, the memories comprise a combination of random access memory and read only memory. In some embodiments, the processor and memory may be combined in a single chip.

The digital processor 440 can be variously embodied, such as by a single core processor, a dual core processor (or more generally by a multiple core processor), a digital processor and cooperating math coprocessor, a digital controller, or the like. The digital processor, in addition to controlling the operation of the computer, executes instructions stored in memory for performing the method outlined in FIGS. 1, 2 and 3, and others discussed herein.

The system may output the information, specifically, document image information, to an external computing device, such as device, or to another output device, such as a display device, such as a screen, or a hardcopy output device, such as a printer, or the like, or to a remote memory storage device. The source/output device may be connected directly with the system or linked thereto, e.g., via a wired or wireless link, such as a local area network or wide area network, such as the Internet. In some embodiments, the information output of the system is stored in memory for further processing, in which content of the document page is labeled or otherwise processed, using the identified structures as input information. The system may generate a graphical user interface (GUI) for display to a user. The exemplary GUI may enable a user to interact with the system via a display screen with a user input device, such as a cursor control device, keyboard, keypad, joystick, touchscreen, or the like. In one exemplary embodiment the display screen 470 is linked to the client computing device 465 and client device includes a web browser which allows the user to interact with the apparatus.

Various aspects and descriptions of the disclosed exemplary embodiments of a method and system to extract mathematical structures associated with a financial table are provided below.

Several 'update' strategies have been tested when a backtracking correction is performed, including updating the normal stack only or updating all the stacks, without a significant impact in practice. For the dataset evaluated, the single use of the flat stack covers 99% of the cases. Adding the a=a stack provides an increase in the performance in general.

Fundamentally, the increased performance of the disclosed method and system of extracting mathematical structures associated with financial tables is due to the use of a greater number of elements of the table, relative to the normal LR single stack parser.

The method applied to Table II shown in FIG. 14 is presented here in order to illustrate the use of several stacks. The analysis using the normal LR-parser is shown first in FIG. 6, then with the multi-stack parser, shown in FIG. 7. FIG. 5 shows an initial mathematical column extracted from Table II.

The example is simple, but the evaluation shows that for long complex tables with several hierarchical levels of operations, the use of several stacks is required and efficient.

The processing time is not a function of the number of rows, but of the length of the longest sum. A 10,000-row table with a sub-total every 10 rows will be faster analyzed than a 1000-row table with only one sum occurring in the last row.

As shown in Table IV, a table can have several numerical columns or rows. Sparse columns are very challenging, the 0=0+0 problem generating too many options. In order to find the best global analysis for a table, the following method is applied:

1) For each column of the table; the number of numbers is computed;

2) The column with the greatest number of numbers (the column which is the less empty/has the most of constraints; zero values being not considered) is first selected and its mathematical structure is computed.

3) The resulting structure is applied against the other columns. If the other columns are compatible with this structure (sums occur in the same lines), the mathematical structure is validated.

4) If discrepancy is found on a column, this column is also processed and the different results are kept.

Extensions of the disclosed method and system include the following:

A specificity of the '+' operation is that it can handle thousands of operands. Notably, other operations with such a large number of operands were not found. For the other operations, and for a limited numbers of operands (10 to 20), a greedy approach can be used, similar to U.S. Pat. No. 7,856,388, by Srivastava et al., issued Dec. 21, 2010 and entitled "FINANCIAL REPORTING AND AUDITING AGENT WITH NET KNOWLEDGE FOR EXTENSIBLE BUSINESS REPORTING LANGUAGE". The strategy is then to build '+' operations, and perform a greedy search for finding potential equations with multiple operations.

The method was tested on a dataset composed of Investments schedules from NQ filings including forms requested by The U.S. Securities and Exchange Commission for mutual funds. These tables describe the investments done by a mutual fund and can be very long, up to 2200 rows. In addition, these tables can be mathematically structured as one single equation where one grand total corresponds to the total investments. The simple normal single stack LR-parser was tested and compared with the disclosed method. The dataset is composed of 200 tables with each table having more than 250 rows (up to 2200 rows for some tables; totalizing more than 145,000 rows). The improvement of the disclosed method, compared to the basic LR-stack was a +22% absolute improvement in terms of accuracy (58% to 80%). In other words, the single stack LR-parser correctly identified the mathematical structure of 115 tables and the disclosed multi-stack LR-parser correctly identified the mathematical structure of 159 tables.

In terms of processing time, the single stack LR-parser is, of course, the faster method. See http://www.sec.gov/Archives/edgar/data/729528/00000519311200 0789/afis_n-q.htm for the original filing with the complete table.

For the remaining failed 41 tables, these tables were in fact truncated or composed of several 'tables' (the HTML table tag is used to extract tables, and in some cases, this does not correspond to the 'visual table'). Nevertheless, for these 41 remaining tables, the disclosed method proposes a correct mathematical structure where the number of complete equations in the table are counted, and the analysis is considered correct if the method produces the same number of equations. Two exceptions were for tables where one sub-total does not correspond to the sum of its elements. For a third table, one error was due to a rounding issue (184069+166206=350276).

Figure 8:
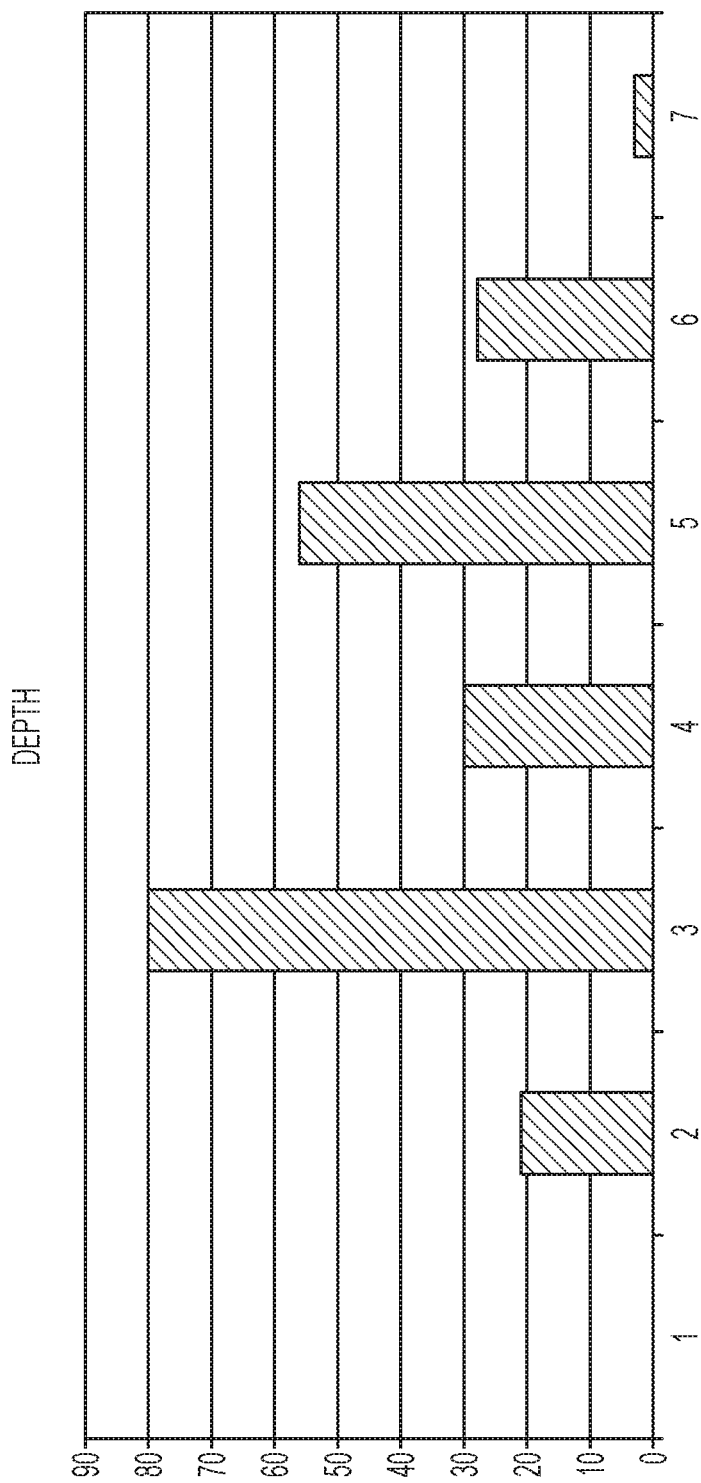
FIG. 8 is a histogram showing the depth of mathematical structures generated for extracted financial tables processed according to an exemplary embodiment of this disclosure.

The histogram in FIG. 8 shows the depth of the mathematical structure generated for the tables: Most of the tables have a hierarchical depth of 4 and more.

Notably, the use of only two stacks, i.e., normal and flat stacks, seems to be enough for 99% of the tables.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of extracting a mathematical structure representation of a digital version of a financial table associated with a financial document using a document processing system including a memory and a processor communicatively coupled to the memory for performing the method, the method comprising:
   a) detecting a financial table included in the financial document, the financial table including a plurality of line items organized in columns and rows, each line item associated with a row and one or more columns, each row including a value label associated with a first column and a respective value associated with a second column;
   b) extracting a first value associated with the second column;
   c) shifting the extracted first value to a top location of a LR-(Left-to-Right) parser reducing stack and shifting the extracted first value to a top location of a nonreducing stack;
   d) extracting a second value associated with the second column;
   e) shifting the extracted second value to the top location of the LR-parser reducing stack directly above the first value, and shifting the extracted second value to the top location of the nonreducing stack directly above the first value;
   f) determining if the second value shifted to the top location of the LR-parser reducing stack is a sum of any sequential preceding values below in the LR-parser reducing stack or nonreducing stack and if the second value shifted to the top location of the LR-parser reducing stack is a sum of any sequential values below in the LR-parser reducing stack or nonreducing stack, eliminating the sequential preceding values below in the LR-parser reducing stack which provide the sum and retaining the second value shifted to the top location of the LR-parser reducing stack which is the sum, while retaining all sequential preceding values below in the nonreducing stack;
   g) repeating steps d)-f) for all sequential values included in the second column of the financial table to generate a final LR-parser reduced stack; and
   h) processing the final reducing stack to generate a mathematical structure associated with the second column.

2. The computer-implemented method of extracting a mathematical structure according to claim 1, wherein the financial table is one of a balance sheet, a cash flow document, and any other financial statement.

3. The computer-implemented method of extracting a mathematical structure according to claim 1, further comprising:
   i) generating a report including the generated mathematical structure.

4. The computer-implemented method of extracting a mathematical structure according to claim 3, further comprising:
   j) performing one or more of displaying the generated report on a computer display, printing the generated report and further processing the generated report.

5. The computer-implemented method of extracting a mathematical structure according to claim 1, wherein the nonreducing stack is a flat stack.

6. The computer-implemented method of extracting a mathematical structure according to claim 1, wherein the nonreducing stack is a plurality of stacks.

7. A computer program product comprising a non-transitory recording medium storing instructions for performing the method of claim 1, and a processor in communication with the memory which implements the instructions.

8. A system comprising memory storing instructions for performing the method of claim 1, and a processor in communication with the memory which implements the instructions.

9. A document processing system for generating a mathematical structure representation of a digital version of a financial table associated with a financial document, the document processing system comprising:
   a financial table detection module configured to detect a financial table included in the financial document, the financial table including a plurality of line items organized in columns and rows, each line item associated with a raw and one or more columns, each row including a value label associated with a first column and a respective value associated with a second column;

an extraction module configured to sequentially extract a plurality of values associated with the second column;

a nonreducing stack module configured to sequentially process a plurality of extracted values associated with the second columns to generate a nonreduced stack of the extracted values;

a LR-(Left-to-Right) parser reducing stack module configured to sequentially process the plurality of extracted values associated with the second column to generate a reduced stack of the extracted values; and a mathematical structure generation module configured to generate a mathematical structure associated with the second column, wherein one or more of the financial table detection module, the extraction module, the nonreducing stack module, the LR-parser reducing sack module and the mathematical structure generation module are configured to perform:

a) detecting a financial table included in the financial document, the financial table including a plurality of line items organized in columns and rows, each line item associated with a row and one or more columns, each row including a value label associated with a first column and a respective value associated with a second column;

b) extracting a first value associated with the second column;

c) shifting the extracted first value to a top location of a LR-(Left-to-Right) parser reducing stack and shifting the extracted first value to a top location of a nonreducing stack;

d) extracting a second value associated with the second column;

e) shifting the extracted second value to the top location of the LR-parser reducing stack directly above the first value, and shifting the extracted second value to the top location of the nonreducing stack directly above the first value;

f) determining if the second value shifted to the top location of the LR-parser reducing stack is a sum of any sequential preceding values below in the LR-parser reducing stack or nonreducing stack and if the second value shifted to the top location of the LR-parser reducing stack is a sum of any sequential values below in the LR-parser reducing stack or nonreducing stack, eliminating the sequential preceding values below in the LR-parser reducing stack which provide the sum and retaining the second value shifted to the top location of the LR-parser reducing stack which is the sum, while retaining all sequential preceding values below in the nonreducing stack;

g) repeating steps d)-f) for all sequential values included in the second column of the financial table to generate a final LR-parser reduced stack; and h) processing the final reducing stack to generate a mathematical structure associated with the second column.

10. The document processing system for generating a mathematical structure according to claim 9, wherein the financial table is one of a balance sheet, a cash flow document, and any other financial statement.

11. The document processing system for generating a mathematical structure according to claim 9, wherein the system is configured to generate a report including the generated mathematical structure.

12. The document processing system for generating a mathematical structure according to claim 11, wherein the system is configured to perform one or more of displaying the generated report on a computer display, printing the generated report and further processing the generated report.

13. The document processing system for generating a mathematical structure according to claim 9, wherein the nonreducing stack is a flat stack.

14. The document processing system for generating a mathematical structure according to claim 9, wherein the nonreducing stack is a plurality of stacks.

* * * * *